United States Patent [19]

Bullions, III et al.

[11] 4,441,153

[45] Apr. 3, 1984

[54] INSTRUCTION REGISTER CONTENT MODIFICATION USING PLURAL INPUT GATES AND A DATA FLOW REGISTER

[75] Inventors: Robert J. Bullions, III, Poughkeepsie; Thomas A. Enger, Wappingers Falls, both of N.Y.

[73] Assignee: International Business Machines Corp., Armonk, N.Y.

[21] Appl. No.: 250,812

[22] Filed: Apr. 3, 1981

[51] Int. Cl.³ .......................... G06F 9/00; G06F 9/22; G06F 9/30
[52] U.S. Cl. .................................................. 364/200
[58] Field of Search .............................. 364/200, 900

[56] References Cited

U.S. PATENT DOCUMENTS

| | | | |
|---|---|---|---|
| 3,503,046 | 3/1970 | Geissler | 364/200 |
| 3,585,599 | 6/1971 | Hitt et al. | 364/200 |
| 4,200,927 | 4/1980 | Hughes et al. | 364/200 |
| 4,262,330 | 4/1981 | Berglund et al. | 364/200 |
| 4,338,661 | 7/1982 | Tredennick et al. | 364/200 |
| 4,348,724 | 9/1982 | Cushing et al. | 364/200 |
| 4,373,182 | 2/1983 | Schultz et al. | 364/200 |
| 4,398,247 | 8/1983 | Bazlen et al. | 364/200 |

Primary Examiner—James D. Thomas
Assistant Examiner—Archie E. Williams, Jr.
Attorney, Agent, or Firm—Robert W. Berray

[57] ABSTRACT

The instruction register (IR), of a data processing system, stores a program instruction during at least an initial operation code decoding phase to initiate execution of the instruction. The IR (13) has a number of input gates in addition to the input gates from a program storing main storage device. The additional input gates respond to control or logic signals for gating information from the data flow hardware (40) to the instruction register.

5 Claims, 2 Drawing Figures

4,441,153

INSTRUCTION REGISTER CONTENT MODIFICATION USING PLURAL INPUT GATES AND A DATA FLOW REGISTER

PATENTS INCORPORATED BY REFERENCE

The following U.S. Patents, having the same assignee as the present invention are herein incorporated by reference:

1. U.S. Pat. No. 3,585,599 entitled "Universal System Service Adapter" by B. C. Hitt et al and issued June 15, 1971; and
2. U.S. Pat. No. 4,200,927 entitled "Multi-Instruction Stream Branch Processing Mechanism" by J. F. Hughes et al and issued April 29, 1980.

BACKGROUND OF THE INVENTION

This invention relates generally to stored program data processing systems, and more particularly to means for changing the contents of an instruction register during instruction execution.

The two patents incorporated by reference disclose data processing systems designed in accordance with the architecture, or functional description, of an IBM System/370 data processing system. This architecture is described in a document entitled "IBM System/370 Principles of Operations" Form No. GA22-7000-4, copy-righted 1972.

Both of the data processing systems described in the above cited references were designed at a time when the definition of an IBM System/370 system included a certain number of program instruction formats that had to be decoded and interpreted for execution. After the design of these systems, a new IBM System/370 instruction format was defined. The transfer paths of various instruction fields from an instruction register to other portions of the data processing system could not accommodate the new format. Substantial changes had to be made to the design of systems subsequently built or the microprogram control of the systems had to be substantially redesigned.

In some large data processing systems, such as the above-identified Reference 2, a transfer path exists between certain fields of an instruction register in an instruction handling unit to a corresponding register in an execution unit. However, the new instruction format re-positioned part of the information transferred to the execution unit to a different portion of the instruction register, and therefore additional cabling would be required to transfer the information from the instruction register to the execution unit. Essentially all data processing systems develop permanent error conditions during operation, or during early development design phases. The ability to bypass faulty hardware in the system, or modify the operation of the system for continued use during repair or re-design is not easily achieved. Another occasional data processing system requirement is to provide special functions for a particular user. If the special function cannot be performed by existing program instructions, then new programs, micro-programs, instructions, or hardware changes may be required.

SUMMARY OF THE INVENTION

It is a primary object of the invention to provide an improved stored program data processing system organization more adaptable to change for error conditions, special functions, or new instructions.

This object is achieved by the addition of a transfer path in the central processing unit (CPU) of a data processing system between an instruction register and the data flow path of the CPU which processes data in accordance with an instruction in the instruction register. The data flow path includes at least one data flow register to which the contents of the instruction register can be transferred. The added transfer path includes a set of gates providing inputs to at least some fields of the instruction register. The control mechanism of the CPU has the ability to transfer at least certain parts of the information content in the data flow register through the gates to the input of the instruction register. The data flow register not only receives information from the instruction register, it can also receive information from either the control mechanism or other portions of the data flow as part of normal data processing. Information stored in the data flow register can then be transferred to the input gates of the instruction register.

A coded operation control field (OP CODE) in the instruction register of any data processing system is utilized for initiating instruction execution by the control mechanism. With the ability to selectively modify the operation control field in the instruction register during an instruction execution, the existing control mechanism can be utilized to respond to the operation control field as part of some other instruction execution.

New instruction formats can be accommodated with the ability to transfer the contents of the instruction register to the data flow register. If fields of existing instructions have been re-positioned in the new format, the new format instruction will be transferred to the data flow register. The fields of interest are transferred back to their original positions in the instruction register for use by existing output gates or controls connected to the instruction register.

DETAILED DESCRIPTION OF THE PREFERRED EMBODIMENT

Figure 1:
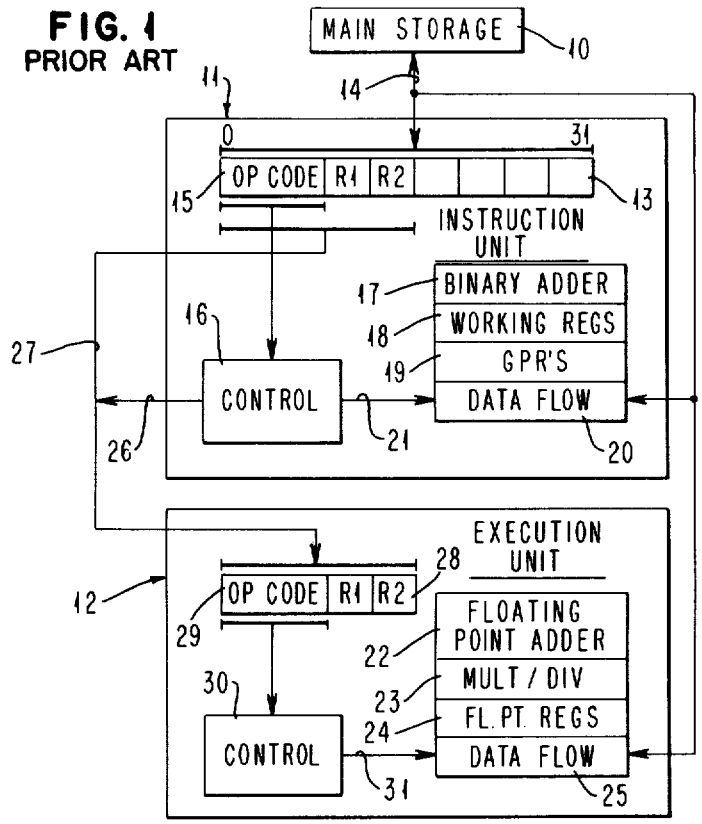
FIG. 1 is a block diagram of a typical stored program data processing system showing an instruction register and its relationship to other functional units in the CPU of a data processing system.

FIG. 1 is a block diagram of a typical data processing system. The system would include a Main Storage 10 which contains data to be processed and sequences of instructions making up various programs to be executed by the data processing system. Major units of a central processing unit (CPU) include an Instruction Unit 11 and an Execution Unit 12. The CPU of the above-cited Reference 1 would include only a single major unit identified as the Instruction Unit 11 in which all instructions would be executed. The above cited Reference 2 includes two separate units, one including the Instruction Unit 11 and another including the Execution Unit 12. In either system, each would include an Instruction Register 13 which receives a sequence of System/370 instructions on a transfer path 14 from main storage 10. The path 14 also transfers data between the CPU and the Main Storage 10 of the data processing system.

In most of the data processing systems designed in accordance with the IBM System/370 architecture, the Instruction Register 13 is comprised of 32 binary bits. Binary bit positions 0 through 7 comprise an operation code (OP CODE) field 15 which is coded to indicate the execution sequence to be performed by a Control mechanism 16 which receives the OP CODE field 15 for purposes of initiating execution.

Other portions of the CPU of a typical data processing system are shown in FIG. 1 and include a Binary Adder 17, and a number of hardware Working Registers 18. Sixteen General Purpose Registers (GPR's) 19 are provided. Use of GPR's is defined in the above-mentioned IBM System/370 Principles of Operations, and are instruction addressable by one or more 4-bit fields (R1 R2) of an instruction in the Instruction Register 13. A data flow 20 interconnects all the various units within the data processing system and includes gates energizable by suitable control signals 21 from the Control 16.

All of the units just mentioned in connection with the Instruction Unit 11 of FIG. 1 are included in the above-cited Reference 1. In this reference, the Control 16 is comprised of a micro-program control store which responds to the OP CODE field 15 to generate the necessary control signals 21 to perform the operation called for. As is well known in the design of data processing systems, the Control 16 can also be a number of hardwired sequencers which generate the necessary control signals 21.

Reference 2 shows a separate Execution Unit 12. In a data processing system that has two separate units, the Instruction Unit 11 is capable of executing a number of IBM System/370 instructions including most binary arithmetic instructions and a number of control instructions. The separate Execution Unit 12 is provided for executing more complex IBM System/370 instructions. For example, the execution unit 12 would include a Floating Point Adder 22, specialized hardware for Multiply and Divide 23 (including binary or floating point multiply and divide), a number of Floating Point Registers 24, and a data flow 25 interconnecting these various units. The Floating Point Registers 24 are addressed and accessed by 4-bit fields such as R1 and R2 in an instruction.

In a data processing system configuration shown in FIG. 1 where a separate Execution Unit 12 is provided, the Control 16 in the Instruction Unit 11 will detect an OP CODE field 15 calling for execution by the Execution Unit 12. In response to a control signal 26 from Control 16, binary bits 0-15 of Instruction Register 13 will be transferred on a line 27 to an Operation Register 28 in the Execution Unit 12. The Floating Point Registers 24 to be utilized in a floating point operation, will be identified by the R1 and R2 fields transferred from the Instruction Register 13 to the Operation Register 28. In a manner similar to the Instruction Unit 11, the OP CODE field 29 in the Operation Register 28 will be transferred to a Control mechanism 30 in the Execution Unit 12 to perform the operation called for. The Control 30 will generate necessary control signals 31 to control the units within the Execution Unit 12. The Control 30 can be designed either as hardwired sequencers or microprogram instructions in a control store.

Figure 2:
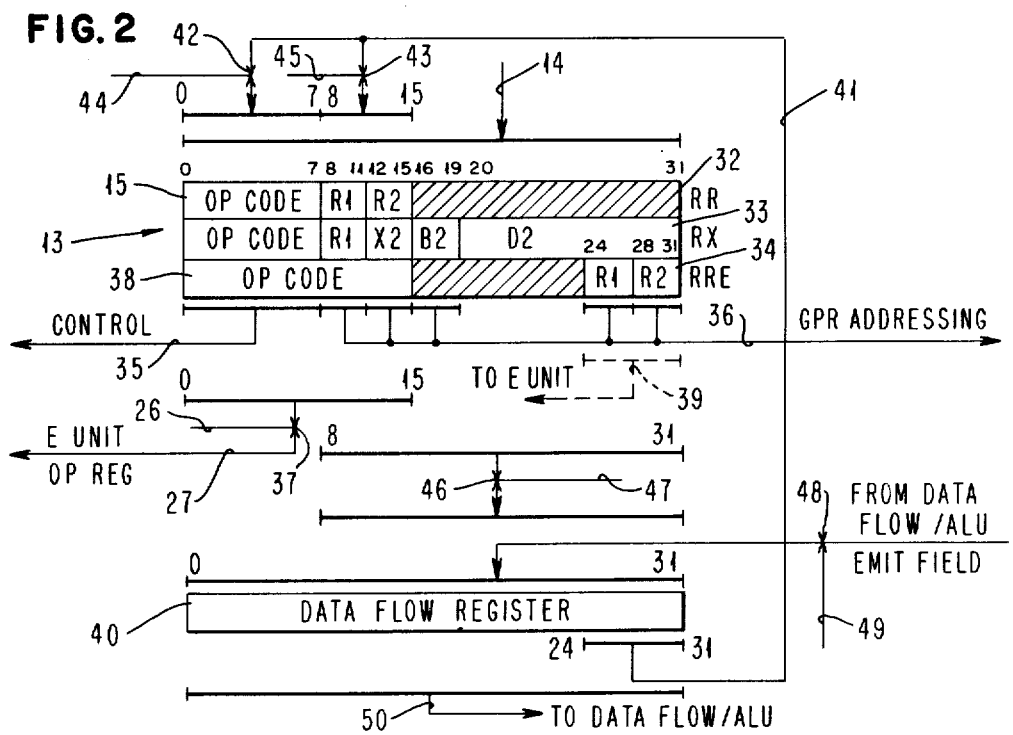
FIG. 2 is a representation of an instruction register and data flow register in a data processing system incorporating the transfer path of the present invention.

The present invention is shown in FIG. 2. A typical Instruction Register 13 with a 32-bit input 14 referred to in FIG. 1 is shown. Three of the IBM System/370 instruction formats are represented in FIG. 2. The RR format is shown at 32. In this format, the instruction includes the 8-bit OP CODE field 15 and two 4-bit fields R1 and R2 which access the GPR's for data to be utilized in execution of the instruction. The RX format is shown at 33. In this instruction format, there is also an 8-bit OP CODE field 15 and a 4-bit field R1 designating a GPR to be utilized during execution and for storing the results. Also disclosed in the RX format 33 are fields utilized for the purpose of generating an address in the main storage 10 in FIG. 1. The X2 field identifies a GPR containing an address index value, the B2 field identifies a GPR containing a base address value, and the 12-bit field D2 is an address displacement value. The contents of the GPR's identified by the X2 and B2 fields are added together with the address displacement field D2 to generate a Main Storage 10 address for the access of data to be utilized in executing the instruction. The final System/370 instruction format shown at 34 is identified as an RRE instruction. In this format, the OP CODE field is comprised of binary bits 0-15, and the addressable registers are identified by the R1 and R2 fields shown in bit positions 24-31 of the Instruction Register 13.

Shown in FIG. 2 is a cable 35 for interconnecting the OP CODE field 15, comprised of bits 0-7 of the Instruction Register 13, to the Control mechanism 16 shown in FIG. 1. Various other sets of gates connected to the output of the Instruction Register 13 transfer the 4-bit register addressing fields of an instruction on a cable 36 for accessing particular ones of the instruction addressable registers. In accordance with the description in the above-cited Reference 2, and as referred to in connection with FIG. 1, the control signal 26 of FIG. 1 will be effective to enable sixteen gates, shown at 37, for the purpose of transferring, in parallel, the contents of binary bit positions 0-15 on cable 27 to the Operation Register 28 of the Execution Unit 12.

In the data processing system described in the above cited Reference 2, the RR format instruction 32 is utilized for initiating floating point operations involving designated ones of the Floating Point Registers 24 of FIG. 1. The transfer path 27 between the Instruction Register 13 and the Operation Register 28 of the Execution Unit 12, is used for transferring the R1 and R2 fields of the instruction 32 to the Execution Unit 12. However, subsequent to the design of this system, the instruction format RRE was defined, and is comprised of a 16-bit OP CODE field 38. The 4-bit R1 and R2 fields for accessing the floating point registers to be utilized were changed to bit positions 24-31. In accordance with the configuration of the data processing system shown in Reference 2, it would be necessary to provide gates and a transfer path, represented by the dotted lines 39, to transfer the R1 and R2 fields to the Execution Unit 12.

Any requirement of providing a new transfer path between the Instruction Register 13 and other portions of a CPU is eliminated by the present invention. The present invention incorporates a transfer path between the Instruction Register 13 and at least one Data Flow Register 40, making up a set of Working Registers 18 of FIG. 1. The Working Registers 18 are accessible by the Control 16, but not an instruction. This transfer path, with associated enabling gates, will be under control of the Control 16 of FIG. 1, the sequencing of which is initiated by the transfer of the OP CODE field 15 on line 35.

The transfer path includes a line 41 connected to the outputs of binary bit positions 24-31 of the Data Flow Register 40 to the input of input gates 42 and 43. The input gates 42 and 43 have outputs connected to a first field of the Instruction Register 13 comprised of bit positions 0-7 and 8-15 respectively. The input gates 42 and 43 can be selectively enabled by signal lines 44 and 45 respectively from the Control 16 shown in FIG. 1. Therefore, bit positions 24-31 of the Data Flow Register 40 can be transferred to, and selectively stored in, Instruction Register 13 bit positions 0-7 or 8-15.

A set of Instruction Registers 13 output gates 46, when enabled by line 47 from the Control 16 of FIG. 1 are effective to transfer a second field, comprised of bit positions 16-31, and positions 8-15 from the Instruction Register 13 to bit positions 8-31 of the Data Flow Register 40. At this point, it should be apparent that a path has been provided to transfer the R1 and R2 fields of an RRE instruction 34 to the Execution Unit 12 Operation Register 28 by the just described transfer path. That is, when the Control 16 of FIG. 1 detects the existence of an RRE format instruction on line 35, bit positions 8-31 of the Instruction Register 13 will be transferred by gates 46 to the Data Flow Register 40. The Control 16 would then enable gates 43 by the signal on line 45 to transfer bit positions 24-31 of the Data Flow Register 40 on line 41 to bit positions 8-15 of the Instruction Register 13. Energization of signal line 26 by the Control 16 of FIG. 1 will enable gates 37 to transfer the R1 and R2 identifying fields to the Execution Unit 12 Operation Register 28.

A final set of gates 48 enabled by a signal line 49 from the Control 16 are shown in FIG. 2. The set of gates 48 will be effective to transfer information into Data Flow Register 40 from any one of a number of sources in the data flow, such as other hardware registers, the output of an arithmetic and logic unit (ALU) including a shifter, or from fields within microinstructions for example. A line 50 connects the Data Flow Register 40 back to the data flow or ALU. The data flow is therefor capable of moving any type of data to bit positions 24-31 of the Data Flow Register 40. At least one field of a microinstruction, described in the above cited Reference 1, is a field called a EMIT field. Microprogramming sequencing has the ability to transfer control or data from the EMIT field in a microinstruction to the data flow of the CPU. Therefore, information can be inserted in the Data Flow Register 40, and in particular, bit positions 24-31, for subsequent transfer on line 41 through either gates 42 or 43 to the Instruction Register 13.

In addition to the already described capability of repositioning fields from an instruction in the Instruction Register 13 to other fields of the Instruction Register 13, by means of the Data Flow Register 40 and gates 42 and 43, several other desirable features are achieved by utilizing the present invention. For example, it may be desired to create a special processing function in the data processing system, not provided by any particular System/370 instruction. If a special instruction is coded in the OP CODE portion 15 and detected by the Control 16 of FIG. 1, execution of the special instruction may require the assistance of certain of the facilities of the Execution Unit 12. Therefore, during execution of the special instruction by the Control 16, the EMIT field of a particular microinstruction could be transferred through gates 48 to the Data Flow Register 40 for transfer on lines 41, through gates 42, and ultimately to bit positions 0-7 of the Instruction Register 13. The EMIT field could be coded into a bit pattern designating, for example, a floating point multiply. Energization of gates 37 by a signal on lines 26 would then transfer the floating point multiply operation code to the Operation Register 28 of the Execution Unit 12 of FIG. 1. The multiply would be performed, and the results of the execution returned to the Instruction Unit 11.

Another desirable feature now available to the data processing system is to permit corrective action to be taken in the case of erroneous operation, either of a microprogram or hardware within an Execution Unit 12. This feature is available as a result of the ability to gate any desired data from the data flow into the OP CODE field 15 of the Instruction Register 13. An instruction may call for a function to be performed in the Execution Unit 12 in FIG. 1 where it has previously been determined that the hardware required is not functional. The Control 16 will be provided with the ability to recognize an operation code which it is not possible to execute in the Execution Unit 12, and initiate a sequence which will transfer substitute operation codes through the Data Flow Register 40, data path 41, and gates 42 to present operation codes in the Instruction Register 13 OP CODE field 15 which are capable of being executed by functioning hardware.

There has thus been shown a significantly more flexible data processing system by the provision of a transfer path between an instruction register of the data processing system and the data flow. The interconnection permits, for the first time, the ability to gate information into the instruction register in desired fields to modify the functioning of the data processing system during the execution of an instruction previously decoded.

Although this invention has been shown and described with respect to the preferred embodiment thereof, it should be understood by those skilled in the art that various changes and omissions in the form and details of the invention may be made therein without departing from the spirit and the scope of the invention.

Having thus described our invention, what we claim as new and desire to secure by Letters Patent is:

1. A data processing machine including:
   an instruction register for storing a program instruction transferred from a program storage device, each instruction, and therefore said instruction register, including at least a first field including an operation code, and a second field;
   a data flow register;
   input gate means, having inputs connected to said data flow register and outputs connected to said instruction register;
   output gate means, having inputs connected to said second field of said instruction register and outputs connected to said data flow register;
   control means for controlling the central processing unit in accordance with an operation specified by said first field, including an input control signal means connected to said input gate means, and output control signal means connected to said output gate means for selectively gating data from said data flow register to said instruction register or from said instruction register to said data flow register.

2. A data processing machine in accordance with claim 1 further including:
   an execution unit for performing operations specified by said operation code in said instruction register;

transfer gate means having inputs connected to said first field of said instruction register and outputs connected to said execution unit; and said control means includes transfer control signal means, connected to said transfer gate means for selectively transferring said first field of said instruction register to said execution unit.

3. A data processing machine in accordance with claim 2 wherein:

said first field of said instruction register includes first and second portions, specifying said operation code, and addressable hardware registers respectively.

4. A data processing machine in accordance with claim 3 wherein:

said second field of said instruction register includes an addressable hardware register specifying portion; and said output control signal means, input control signal means and transfer control signal means, are energized in sequence.

5. A data processing machine in accordance with claim 1 wherein the data flow path includes:

further register input and output gate means connected to said data flow register and said control means for manipulation of data in said data path, including data from said control means.

* * * * *